United States Patent

[15] 3,646,804

Myers

[45] Mar. 7, 1972

[54] GROSS LEAK DETECTOR AND METHOD

[72] Inventor: Lester W. Myers, Seminole, Fla.
[73] Assignee: Electronic Communications, Inc., St. Petersburg, Fla.
[22] Filed: Jan. 21, 1970
[21] Appl. No.: 4,701

[52] U.S. Cl. .................................................73/45.5, 73/49.3
[51] Int. Cl. .........................................................G01m 3/10
[58] Field of Search....................73/45.5, 49.3, 41.2, 52, 40.5

[56] References Cited

UNITED STATES PATENTS

| | | | |
|---|---|---|---|
| 1,547,126 | 7/1925 | Maede | 73/45.5 |
| 1,675,802 | 7/1928 | Hamilton | 73/45.5 |
| 2,567,215 | 9/1951 | Lacks | 73/45.5 |
| 3,114,257 | 12/1963 | Foster et al. | 73/45.5 |

Primary Examiner—Louis R. Prince
Assistant Examiner—William A. Henry, II
Attorney—Sandoe, Hopgood & Calimafde

[57] ABSTRACT

The invention contemplates observing the gross-leak condition of an article by immersing the same in a liquid inert to the material of the article. A chamber defines a limited volume surrounding the liquid and the article, and the chamber is evacuated while the article is immersed. As pressure reduces to a substantially evacuated condition, the immersed article is observed for the onset of telltale bubbles. The article is then promptly removed from the liquid while still at reduced pressure, thereby allowing the article to begin to dry immediately. The volume is then returned to ambient pressure as drying proceeds. Various specific refinements and embodiments are described.

26 Claims, 8 Drawing Figures

PATENTED MAR 7 1972 3,646,804

INVENTOR
LESTER W. MYERS
BY
Sandoe, Hopgood & Calimafde
ATTORNEYS

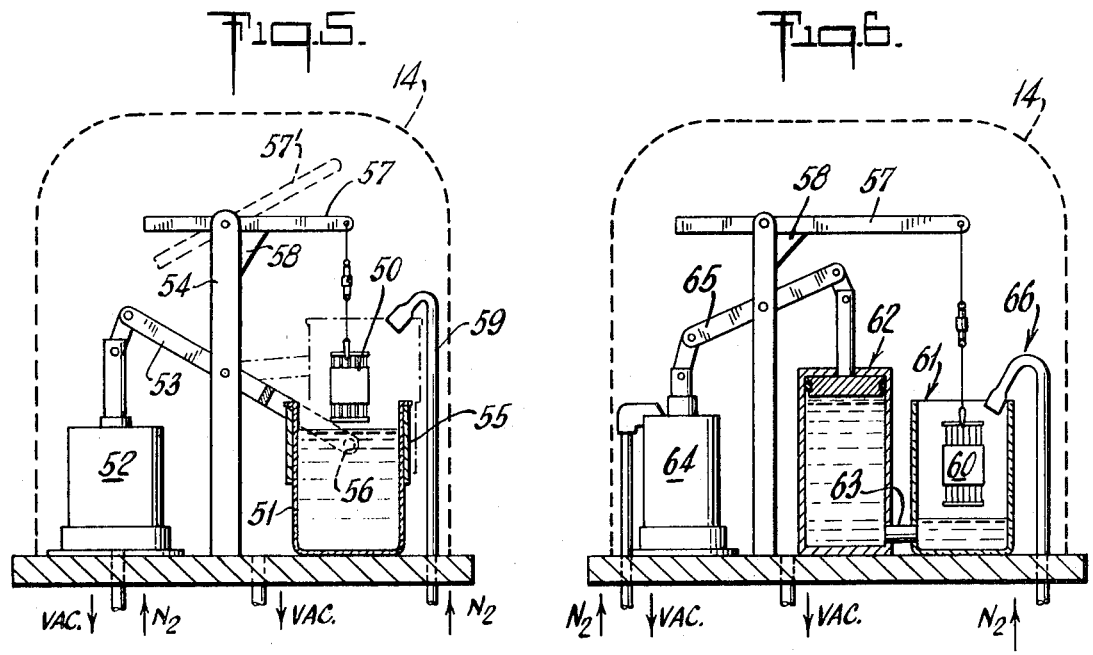
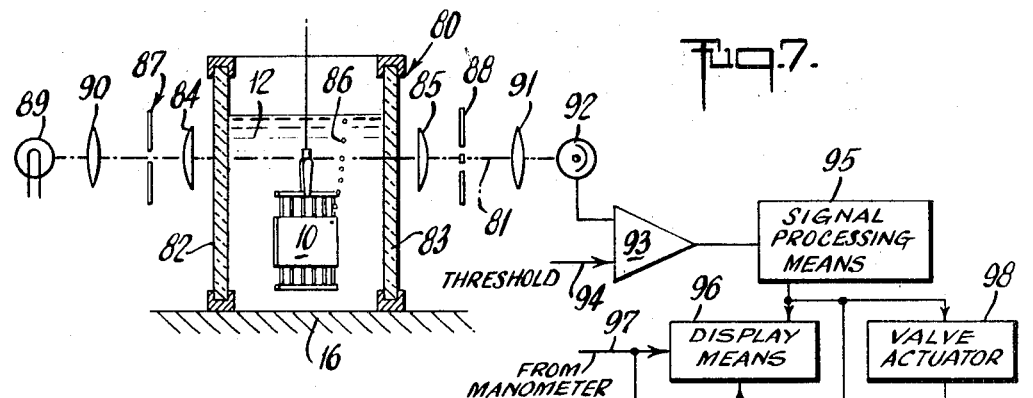
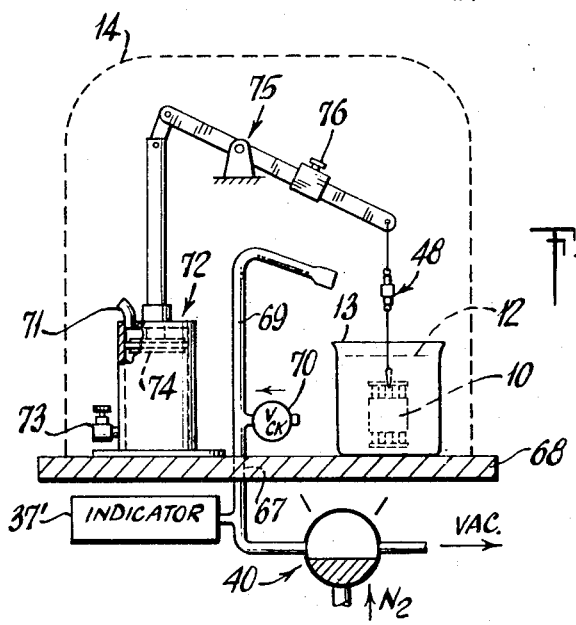

GROSS LEAK DETECTOR AND METHOD

This invention relates to the detection of a leak condition in an article that is supposedly sealed against leakage.

The need exists for apparatus, particularly electrical apparatus, which can withstand great extremes of environmental operating conditions. To meet the need, components and circuits are being increasingly miniaturized and sealed, but the question remains as to how effective is the overall seal, upon fabrication and testing of the article. Different markets have different needs of assurance as to the overall sealed integrity of the article, and quality control is basic to the supply of all these markets; an important difference in the ability to serve these different markets is the degree of ambient vacuum that can be assuredly withstood without leakage.

Various devices and methods have been employed for gross-leak detection in such articles. The military and space programs have perhaps the most severe requirements, and various official specifications have been established, based on certain theories of leak detection and on certain apparatus in use today. In general, it can be stated that all present techniques and apparatus exhibit various disadvantages, among which can be listed:

1. Extraordinary time consumption for each test, the time being in the order of several hours per test, necessitating a statistical sampling of production, rather than the testing of all components.
2. Leaks detected by liquid immersion have involved liquid contamination of the article, meaning that it cannot be reworked but must be scrapped.
3. Undue handling of the article is involved.
4. Some of the tests require substantial pressure differentials and/or a heating cycle.
5. The time required has meant operator fatigue, with loss of testing effectiveness and efficiency.
6. It has not been possible to achieve quantitative results, on a production basis.

It is an object of the invention to provide apparatus and a method which substantially avoid the above-noted deficiencies.

Another object is to meet said object with a test cycle in the order of one or a few minutes, rather than hours.

A further object is to meet the above objects within a maximum test pressure differential of 15 lbs./in.$^2$, and without requiring heat, thus minimizing chances of article damage during the test.

A specific object is to obtain gross-leak data of the character indicated, without contaminating or damaging the article, and permitting rework of the tested article, if necessary.

It is in general an object to meet the above objects with simple apparatus, presenting minimum opportunity for article damage or operator fatigue, and yielding positive qualitative and/or quantitative results as may be required, all with a substantial economic saving, compared to present techniques.

Another specific object is to meet the stated objects while achieving a leak sensitivity of at least substantially $1\times10^{-5}$ cc./sec. of air.

Other objects and various further features of novelty and invention will be pointed out or will occur to those skilled in the art from a reading of the following specification in conjunction with the accompanying drawings. In said drawings, which show, for illustrative purposes only, preferred forms of the invention:

FIGS. 5 and 6 are simplified similar diagrams to illustrate two successive modifications;

FIG. 7 is a simplified fragmentary sectional view of a modification of part of FIG. 1; and FIG. 8 is a schematic diagram, partly in vertical section, to show additional component apparatus in use with structure otherwise as in FIG. 1.

Briefly stated, the invention contemplates observing the gross-leak condition of an article by immersing the same in a liquid inert to the material of the article. A chamber defines a limited volume surrounding the liquid and the article, and the chamber is evacuated while the article is immersed. As pressure reduces to a substantially evacuated condition, the immersed article is observed for the onset of telltale bubbles. The article is then promptly removed from the liquid while still at reduced pressure, thereby allowing the article to begin to dry immediately. The volume is then returned to ambient pressure as drying proceeds. Various specific refinements and embodiments are described.

Figure 1:
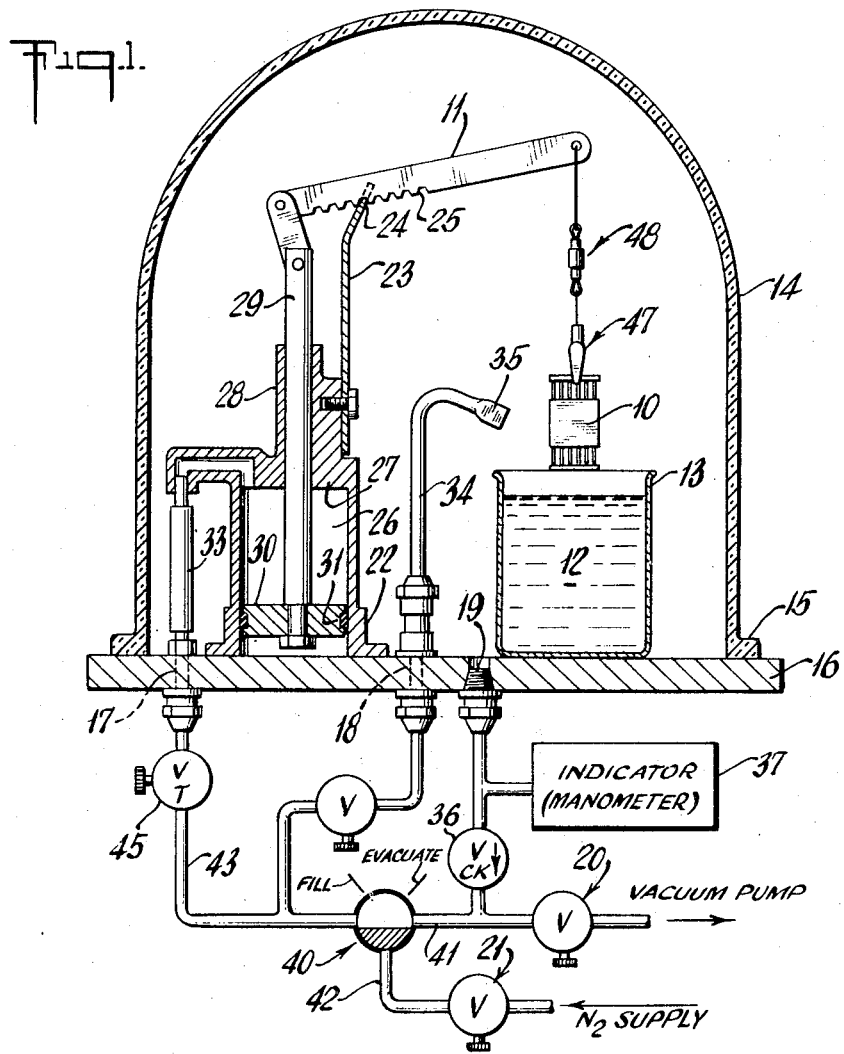
FIG. 1 is a simplified, partly schematic, vertical sectional view through gross-leak detection apparatus of the invention.

FIG. 1 illustrates the invention in a system in which an article to be tested is suspended from a beam 11. Beam 11 is rocked to immerse article 10 in liquid 12 within a suitable vessel, shown as a glass beaker 13. All operations are performed within an enclosing chamber, which conveniently comprises a glass bell jar 14 having sealing engagement at its base rim 15 against a substantial flat base (plate) or table 16. Various fluid connections 17–18–19 through the baseplate 16 enable evacuating, beam-actuating, and refilling functions within the chamber enclosure.

In accordance with a feature of the invention, the vacuum, available from a suitable supply such as a pump (now shown), serves the dual functions of evacuating the chamber and of actuating beam 11 for liquid immersion of the article 10. And in analogous fashion, the inert gas supply for refilling the chamber serves the added function of withdrawing the article 10 from liquid 12 at the outset of the refilling process. These respective supply connections are shown with their individual shutoff valves or petcocks 20–21.

Upstanding structure fixed at flange 22 to the base plate 16 carries an arm 23 to provide a horizontal axis fulcrum for beam 11. As shown, arm 23 has a bifurcated upper end, with a knife edge crotch 24 to define the fulcrum. Serrations 25 along the underside of beam 11 permit fulcrum-position selection, as appropriate to the actuating stroke to accommodate articles 10 of different size. The upstanding frame structure includes a cylinder 26, cylinder head 27 and block 28, for supporting the fulcrum arm 23 and for guided alignment of the stem 29 of a piston 30. Piston is shown with peripheral groove containing a seal ring 31, although a metal-backed fiber piston has also been found to be satisfactory. A link 32 connects the end of stem 29 to the end of beam 25, to eliminate angularity effects.

For the form shown, the fluid connection 17 serves a conduit 33 communicating exclusively with cylinder 26 in the space above the piston 30. The fluid connection 18 serves another conduit 34 which is preferably sufficiently rigid to be self-supporting and yet sufficiently soft to adapt to such bending as may be needed to selectively adjust the orientation of a nozzle 35; conduit 34 may be of soft copper tubing, and nozzle 35 is used to direct inert drying gas at the article 10, once it is removed from the liquid 12, and throughout the drying and chamber-filling phase. The fluid connection 19 is an exhaust port for the chamber 14–16, and a check valve 36 to the vacuum pump line assures its exclusive use for this purpose. Conveniently, a pressure indicator 37, such as a manometer, is connected between check valve 36 and connection 19, to track the evacuated pressure status within the chamber.

The remaining fluid-pressure connections are dominated by a two-way selector valve 40 which is manipulated to selectively connect either the vacuum supply line 41 or the inert gas supply line 42 to the interior of the chamber. In FIG. 1, valve 40 is in its "EVACUATE" position, wherein gas line 42 is blocked and wherein the vacuum line 41 serves separate branches 43–44 to the base connections 17–18. A throttle 45 in line 43 enables adjustment of the rate of actuating beam 11, depending on the size and weight of article 10, and depending on the fulcrum selection along serrations 25. A petcock 46 in line 44 enables sequencing, as desired, of beam actuation in relation to commencement of evacuation of the substantial remaining volume in the enclosing chamber. Upon shifting valve 40 to its "FILL" position, the vacuum line 41 is blocked, and the inert gas supply line 42 admits drying gas both to retract the beam and its suspended article and to direct a mild blast of drying flow at the retracted article.

Figure 2:
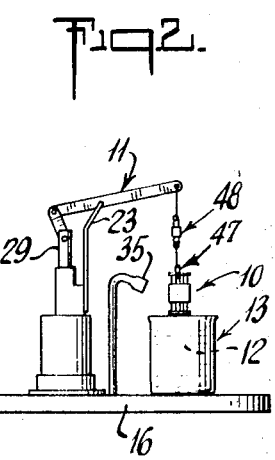
FIGS. 2, 3 and 4 are reduced, further simplified similar diagrams to illustrate different relationships in a cycle of use of the apparatus of FIG. 1.
Figure 3:
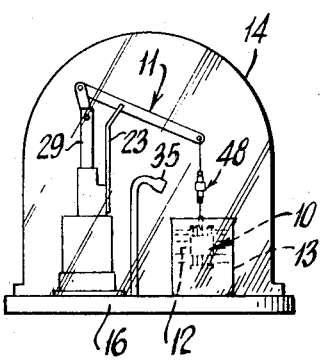
Figure 4:
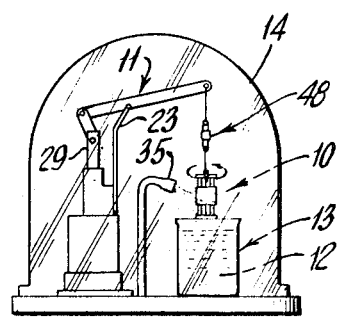

In the sequence of FIGS. 2, 3 and 4, the apparatus is first shown with jar 14 removed, in order that article 10 may first be suspended, in vertical register with the immersion liquid 12. Conveniently, for the case of the integrated circuit shown as the test article 10, an alligator clip 47 grips one bank of leads of article 10, and preferably the suspension line from clip 47 to the end of beam 11 includes a freely swiveling element 48, such as a swivel link commonly used by anglers for lure connections; element 48 establishes a vertical swivel axis. The beam 11 is in its raised position, being thus held by the dominating moment attributable to piston 30 and its connections to beam 11, it being noted that beam 11 achieved this position at the close of the test cycle for the previous article 10, with piston 30 in its down position. Before setting the jar 14 in place, to close the chamber, the orientation of nozzle 35 is checked to make sure it will direct drying gas at article 10; the axis of such direction is preferably generally transverse to but slightly offset from the swivel axis of element 48 so that when supplied with drying gas, the nozzle discharge will spin article 10 and thus enhance drying action.

FIG. 3 illustrates the relation of parts after jar 14 has been applied to close the chamber, and after valve 40 has been shifted to its "EVACUATE" position. This at once actuated beam 11 to immerse the article 10 in liquid 12. Evacuation proceeds, and an observant watch is kept for the first sign of bubbles escaping from the article 10. When such bubbles appear, the operator reads the pressure indicator 37 and shifts valve 40 to its "FILL" position, whereupon gas admitted in line 33 is operative to return piston 30 to its down position and at the same time to withdraw article 10 from the liquid (FIG. 4). This withdrawal occurs while evacuated conditions exist, and so there is no opportunity for liquid 12 to be induced to flow into any crevice that may have been responsible for the detected leak. Moreover, the nozzle discharge and article spinning are such as to extract virtually all liquid entrained upon withdrawal; so that drying is virtually complete by the time the inert gas has returned the chamber pressure to ambient. The latter condition is recognized by a gentle intermittent jogging of the jar 14 as it must slightly rise to relieve gas forced into the chamber, the gas pressure being regulated to a level slightly above ambient, e.g., to 16 lbs./in.$^2$.

FIGS. 5 and 6 illustrate alternative structures for accomplishing article immersion and withdrawal. In FIG. 5, the article 50 is held at fixed elevation throughout the test cycle, while the vessel (beaker) 51 is raised and lowered for the respective immersion and withdrawal functions. The fluid-pressure-operated means 52 includes a stem linked to a beam 53, supported by a pivot pin connection to the standard 54 which provides article suspension; the alternating vacuum and gas connections to means 52 are beneath its piston, so that a vacuum drops the piston to pull down the left end of beam 53, and so that the piston and associated end of beam 53 are raised during the gas-fill phase of the cycle. The beaker 51 is cradled in a yoke or collar 55 having gimbal-pivot connection at 56 to the forked end of beam 53. For convenience in mounting the article 50, it is suspended from an arm 57 pivoted to standard 54; its lower position is shown in full lines, resting at a locating stop or bracket 58. In the raised arm position 57' (dashed outline), article 50 is clear of the beaker 51. Finally, a nozzle-supporting conduit 59 is poised to direct drying gas at article 50 upon liquid withdrawal, at commencement of gas filling, and while vacuum conditions exist; it will be noted that by off-axis introduction of drying gas into the limited volume of beaker 51 and above its liquid level, the swirling gas may more effectively induce article spinning. The cycle is otherwise as described for FIGS. 1 to 4.

In FIG. 6, neither the article 60 nor the vessel 61 (for immersion liquid) is moved during the test cycle. On the other hand, the liquid is positively withdrawn and returned, by the action of reciprocating positive displacement pump means 62, having a fluid-communicating conduit connection 63 to the lower part of vessel 61. Fluid-pressure means 64, similar to that at 26-30-33 in FIG. 1, may oscillate a beam 65 to operate the pump 62. The article 60 may be suspended as in FIG. 5, and therefore corresponding parts are given the same reference numbers. Again, a nozzle conduit 66 is set for swirling discharge at and around the article 60, when pump 62 retracts liquid from vessel 61 and, hence, also from article 60.

FIG. 7 represents a modification wherein a single fluid-communicating connection 67 through the baseplate 68 serves all actuating, evacuating, filling and drying functions within the sealed chamber and throughout the test cycle. Connection 67 is directly served by the two-way selector valve 40, and the indicator 37' is connected therebetween, to monitor chamber pressure. Within the chamber, the nozzle conduit 69 is mounted to connection 67. A check valve branch line 70 permits evacuation unlimited by nozzle restrictions, and further assures that all gas-filling will proceed via the nozzle discharge or upper end of conduit 69. An opening 71 at the upper end of cylinder 72 is large compared to that of bleed connection at the lower end of cylinder 72. The relative sizes of these openings is such as to establish actuating pressure differentials across piston 74, with each shift of position at valve 40. Thus, for the vacuum-selected position shown, the bleed 73 has so restricted the outgassing of volume under piston 74 (compared to the much more prompt outgassing of volume above piston 74) that piston 74 is driven up, to the position shown, to accomplish article immersion as in FIG. 1. To hold this actuated position, the beam 75 must first have been balanced, as by counterweight means 76, so that by the time the volume beneath piston 74 is evacuated to substantially the extent of all the rest of the chamber 14, the article immersion position will hold. Having detected a leak, or having otherwise conducted the test to the necessary extent, valve 40 is reversed to supply drying gas to fill the chamber. Again, the bleed restriction 73 causes piston 74 to respond preferentially to gas admitted at port 71, thereby immediately withdrawing the article for drying, as previously described. This withdrawn position, with piston 74 in its down position, will be held, since no further actuating pressure difference can develop across piston 74, until valve 40 is again shifted. Adjustments are shown for the bleed 73 and for counterweight 76, to accommodate particular balance and action responses which apply for articles 10 of different size and weight.

FIG. 8 is a fragmentary diagram devoted to the automatic accomplishment of some of the described operations. In particular, the vessel 80 which contains the immersion liquid 12 is constructed to become a nondistorting part of a bubble-detecting optical system, schematically arrayed on the axis 81. As shown, spaced vertical walls 82-83 of vessel 80 are optically flat, and axis 81 passes horizontally through liquid 12 in the region above the immersed test article 10. Collimating lenses 84-85 span the walls 82-83 and establish a collimated-light volume (in liquid 12) through which bubbles 86 must rise, if they should occur; thus, bubbles 86 will disturb the collimated nature of light between lenses 84-85.

To detect such disturbance, lenses 84-85 are shown imaging a diaphragm slit 87 on a stop 88. A light source 89 utilizes a lens 90 to illuminate the diaphragm 87, and a lens 91 directs light passing the stop 88 to photoelectric means 92. Normally, the illuminated region in the liquid will remain collimated, so that light will focus upon and therefore not pass the stop 88. However, the onset of bubbles 86 will destroy or impair the collimated nature of the light, resulting in passage of light to the photoelectric means 92. Amplifier means 93 serving the output of means 92 is shown with a threshold adjustment 94 to provide an output to suitable signal-processing means 95, whenever the photoelectric means 92 provides a predetermined output level adequately reflecting a bubbling condition.

Thus, the output of processor 95 may operate an alarm or indicator, to alert the operator to a bubble condition.

Specifically, the output of processor 95 may be one of the coordinate inputs to a display device or recorder 96. The other input 97 to display means 96 reflects instantaneous chamber pressure, and the electrical line 97 will be understood schematically to suggest the output of a suitable pressure-tracking transducer forming part of the indicator 37. Thus, display means 96 may include means for digital or other readout of instantaneous chamber pressure (i.e., vacuum condition), and the output of processor 95 may be a pulse to synchronize, gate or trigger the readout or recording of such instantaneous pressure.

As a further feature, an actuator 98 for valve 40 may also electrically respond to a bubble-indicating output from processor 95. Thus, valve 40 may be automatically shifted to its "FILL" position, as soon as a bubble condition is detected.

FIG. 8 also serves to show that in certain situations it may not be necessary or desirable to rely upon bubble detection, before drying the test article and refilling the chamber. For example, if the gross-leak test requirement for the particular article should be exceeded (i.e., a given reduced pressure or vacuum condition met) without bubble generation, then there is no need to proceed with further reduction in pressure. In such case, a threshold device 99, connected to the pressure-indicative line 97 and to the valve actuator 98, may initiate the reversing shift of valve 40, upon achievement of a threshold indicative of the specified test minimum of chamber pressure. A further control connection of threshold means 99 to the display means 96 provides displayed confirmation of the achievement of the said minimum pressure condition.

The described method and apparatus will be seen to achieve the above-stated objects. Operation is basically simple and relatively fast. In use with the presently preferred inert fluorocarbon liquid 12, namely, a "3M-Company" product designated FC–43, the complete test cycle is performed in approximately 3 minutes, with instances of test times in the order of 1 minute; this is to be compared with the approximately 4-hour period involved in other test techniques using pressurized and heated fluorocarbons. In my technique, there is no heating, and the maximum test-pressure differential is 15 p.s.i., as compared with the potentially damaging 100 p.s.i. of the other techniques. In my technique, I have found that no liquid is drawn into a "leaky" article, and that the article is not in any way damaged by the test cycle, thus enabling rework of the article after test.

The liquid FC–43 has been found the best of all liquids that I have thus far tested. It is characterized by the relatively high density of about 116 lbs./ft.$^3$ at room temperature (72° F.); it also has the greatest viscosity, lowest vapor-pressure, and highest boiling point of such inert liquids as I have considered. Specifically, this liquid has not been found, in my test procedure, to exhibit the phenomenon of nucleation, i.e., gas bubble formation on minute rough surfaces of the test article, so that leak bubble observation is positive, clear and unobstructed.

As preliminary precaution, I commence each day's use of the apparatus by degassing the indicating liquid 12 for 15 minutes, for which period the pressure level indicator 37 displays a vacuum of at least 29.5 inches Hg. Thus readied, my equipment exhibits an air-leak sensitivity of $1 \times 10^{-5}$ cc./sec.; it has actually crossed over this lower limit of gross-leak detection and exhibits sensitivity at the upper end of the region of fine-leak detection, i.e., in the range of $1 \times 10^{-6}$ cc./sec.

The foregoing quantitative information is developed by noting, at 37, the pressure at which bubbles commence, it being recalled that pressure is steadily declining until the bubbles appear. The noted pressure is checked against a precalibrated chart, to the leakage rate to which this bubble-onset pressure corresponds. I have generated the calibration chart by using a Veeco Mass Spectrometer Leak Detector, Model MS12, modified with an extra-large roughing pump and an unchoked 85 liters/sec. diffusion pump (to increase speed) so as not to remove the Helium from the correlation test samples. Gross-leak measurements were made possible by standardizing the mass-spectrometer leak detector to a calibrated Veeco leak of $4.5 \times 10^{-5}$ cc./sec. Helium, which is in the gross-leak range. To do this, the electron multiplier gain was reduced and emission current set to 2 ma.

It will be appreciated that the description of the invention has concerned itself primarily with coaction of mechanical and optical parts, and that, for simplicity, the showings have been somewhat schematic to eliminate detail not necessary to the claimed invention. For example, it will be understood that contrast-enhancing techniques may be employed to visually accentuate the onset of bubbles in the liquid 12. When the vessel 13 is a beaker, such enhancement is easily achieved by locally adhering to the outer wall of the beaker a piece of black nonreflecting paper, as by pressure-sensitive tape, in the region which is the background against which bubbles are to be observed.

While the invention has been described in detail for preferred methods and forms, modifications may be made without departure from the scope of the invention. Thus, the actuating means for displacing the arm 11 may be strictly mechanical, through suitable sealing means (such as a bellows) in the base 16, rather than pressure-operated (as shown), and of course such mechanical movements may involve longitudinal displacement or rotary displacement, or both, as will be understood.

What is claimed is:

1. The method of inspecting the overall integrity of seal effectiveness in a sealed article by observing its gross-leak condition, which comprises immersing the article in a liquid inert to the material of the article, evacuating a selected limited volume surrounding the liquid and immersed article, observing the reduced pressure at which leak bubbles begin to escape from the article, removing the article from liquid contact while still at reduced pressure, whereby the article can begin to dry immediately, and then returning said volume to the ambient pressure external to said volume.

2. The method of claim 1, in which the liquid is contained in an open reservoir within said volume, and in which the article is lowered for immersion and is raised for drying.

3. The method of claim 2, in which the article is agitated to accelerate drying.

4. The method of claim 3, in which the return to ambient pressure is accomplished by introducing an inert gas into said volume, and in which said agitation results from the localized and directional introduction of said gas.

5. The method of claim 3, in which agitation includes spinning the article on a vertical axis.

6. The method of claim 5, in which the return to ambient pressure is accomplished by introducing an inert gas into said volume, and in which said introduction is so localized and directed at the article after removal from the liquid as to spin the same.

7. The method of claim 1, in which the return to ambient pressure is accomplished by introducing an inert gas into said volume.

8. The method of claim 1, in which the liquid is cyclically displaceable from a relation of removal from article contact to a relation of article immersion, and return, all within said volume.

9. The method of gross-leak inspecting a sealed article, which comprises immersing the article in a fluorocarbon liquid, evacuating a selected limited volume surrounding the liquid and immersed article, the limiting degree of vacuum being that prescribed for the test, observing the liquid for leak-revealing bubbles escaping from the article, removing the article from liquid contact while still at reduced pressure, whereby the article can begin to dry immediately, and then introducing an inert drying gas into said volume to return the same to ambient pressure.

10. The method of claim 9, in which said liquid is a fluorocarbon of relatively high density.

11. The method of claim 9, in which said gas is nitrogen.

12. Gross-leak-testing apparatus, comprising a selectively openable chamber, first means for containing a supply of liquid within said chamber, second means for supporting an article to be gross-leak evaluated in said chamber, fluid-pressure-operated displacement means within said chamber for relatively displacing said first and second means to selectively effect article immersion in and article-freedom from liquid in said first means, a vacuum connection to said chamber, a gas supply connection to said chamber, said connections including means for opening and closing the same, said displacement means being so connected for fluid-pressure response as to effect article-immersing displacement in response to evacuation of said chamber and to effect reverse displacement to free the article from liquid immersion upon supply of gas to said chamber, and means coordinating the interlaced operation of said connections, whereby upon commencement of evacuation the article may be liquid-immersed and may remain immersed until said last-mentioned means is operated to remove the article from the liquid upon commencement of restoration of pressure within said chamber, so that the article can be drying throughout the period in which pressure in said chamber is being restored to ambient.

13. Apparatus according to claim 12, in which said chamber and said first means include transparent walls to permit viewing an immersed article under evacuated conditions.

14. Apparatus according to claim 12, in which one of said first and second means includes a beam fulcrummed on a horizontal axis in said chamber, said displacement means being connected in actuating relation with one end of said beam, and means at the other end of said beam and poised in vertical register with the other of said first and second means.

15. Apparatus according to claim 12, in which said second means includes a beam fulcrummed on a horizontal axis in said chamber, said displacement means being connected in actuating relation with one end of said beam, and article-suspension means at the other end of said beam and poised in vertical register with said means for liquid containment.

16. Apparatus according to claim 12, in which said first means includes a beam fulcrummed on a horizontal axis in said chamber, said displacement means being connected in actuating relation with one end of said beam, and liquid container support means at the other end of said beam and poised in register beneath said article-supporting means.

17. Apparatus according to claim 12, in which said second means includes means for positioning the article within the container of said first means, and in which said displacement means includes means for selectively displacing liquid into and out of said first means, for effecting selective liquid immersion of the article.

18. Apparatus according to claim 14, in which said beam includes means for selectively positioned fulcrum support, whereby for a given stroke of said displacement means, the stroke of article-to-liquid relative displacement can be varied to accommodate article size.

19. Apparatus according to claim 12, in which said article-support means includes an article suspension freely rotatable on a vertical axis.

20. Apparatus according to claim 12, in which a discharge nozzle is connected to said gas supply connection and is directed at the region of article positioning when said displacement means is in the position for which the article is free of the liquid immersion relationship.

21. Apparatus according to claim 20, in which said article-support means includes an article suspension freely rotatable on a vertical axis, and in which said nozzle is directed on an axis offset from said vertical axis.

22. Apparatus according to claim 12, and including a bubble-presence detector comprising an optical system with a light source and photoelectric means effectively positioned below the liquid surface and above the immersed location of the supported article, display means including a pressure-responsive device connected to track evacuation pressures in said chamber, and a display-operating connection from said photoelectric means to said display means for automatically displaying an indication of the evacuation pressure at which bubble presence is detected.

23. Apparatus according to claim 22, and second display-operating means including threshold-operated means in the connection to said pressure-responsive device to determine a second display upon tracking a threshold of minimum evacuation pressure, whereby it can be indicated that the article has achieved such threshold without exhibiting leakage.

24. Gross-leak detection apparatus, comprising a chamber, first means for evacuating said chamber, second means including inert gas supply means for returning said chamber to ambient pressure, control means for sequentially connecting said first and second means to said chamber, a vessel within said chamber and containing an inert high-density liquid, an article-support mechanism within said chamber and means coordinated with said control means for bringing the article and the liquid into and out of immersed relation, pressure-responsive means for monitoring instantaneous chamber pressure, bubble-presence-detecting means responsive to the onset of a bubble condition within the liquid, and recording means responsive to both said two last-defined means for recording the pressure at which bubbles are first detected.

25. Gross-leak detection apparatus, comprising a chamber, first means for evacuating said chamber, second means including inert gas supply means for returning said chamber to ambient pressure, control means for sequentially connecting said first and second means to said chamber, a vessel within said chamber and containing an inert high-density liquid, an article-support mechanism within said chamber and means coordinated with said control means for bringing the article and the liquid into and out of immersed relation, pressure-responsive means for monitoring instantaneous chamber pressure, bubble-presence-detecting means responsive to the onset of a bubble condition within the liquid, and a control connection from said bubble-presence-detecting means to said control means and operative to shift the connection of said chamber from said first means to said second means upon detection of a bubble condition.

26. The apparatus of claim 25, in which said pressure-responsive means includes a threshold-operated signal generator for producing an output signal upon achievement of a predetermining minimum test pressure, said signal generator being also connected to said control connection, whereby said chamber and article will be automatically returned to ambient pressure if said minimum test pressure is reached without detection of bubbles.

* * * * *